3,730,732
TORTILLA AND PROCESS USING WATER
SOLUBLE ALKALINE SUBSTANCE
Manuel Jesus Rubio, Bridgeport, Conn., assignor to Roberto Gonzalez Barrera, Victor Hermosa, Monterrey, Mexico
No Drawing. Continuation-in-part of applications Ser. No. 58,141, July 24, 1970, and Ser. No. 58,655, July 27, 1970. This application May 2, 1972, Ser. No. 249,624
Int. Cl. A23l 1/10
U.S. Cl. 99—80 R          5 Claims

ABSTRACT OF THE DISCLOSURE

To increase the yield of dough and tortillas by incorporating water soluble alkaline substances.

Also to retard the microbiological spoilage of tortillas which are unleavened, unshortened food products made of noxtamlized corn or nixtamalized corn flour by adding water soluble alkaline substances.

DISCLOSURE OF INVENTION

This application is a continuation-in-part of my application Ser. No. 58,141, filed July 24, 1970, for Tortilla and Process Using Water Soluble Alkaline Substance and of my application Ser. No. 58,655, filed July 27, 1970, for Tortilla and Process Using Alkalizing Substances both now abandoned.

One aspect of the present invention is to increase the yield of tortilla dough and tortillas.

Another aspect of the invention is to retard the microbiological spoilage of tortillas and tortilla dough.

Tortillas and tortilla dough are made from corn which is steeped in calcium hydroxide or sometimes in sodium hydroxide or the like, to produce a reaction with the corn known as nixtamalizing. The nixtamalized corn having a chemical combination with calcium hydroxide or the like is then ground into corn flour which is combined with water to make tortillas.

This steeping during which the reaction ocurs is done at an elevated temperature of say 80° C. and thus it can also be properly said that there is cooking at this time. In addition to the reaction already mentioned and its important general effect on the product that is involved, the steeping has the effect of softening the hull, thus allowing the water to penetrate through the hull into the corn, and also of causing a reaction specifically between some of the calcium and at least some of certain of the oils originally present in the corn to produce special compounds which add to the taste.

This steeping reaction with alkali such as calcium hydroxide produces a product having the ingredients of the corn combined with calcium hydroxide or the like, leaving some alkali free and producing in the tortilla dough if no additive is used a pH in the range from 6.5 to 6.7, there having been a washing operation after the steeping.

I have discovered that if a water soluble alkali such as sodium hydroxide or the like is added to the tortilla dough in controlled proportions as described below, it will have two additional effects which are not obtainable if nixtamalized corn flour is used without additional sodium hydroxide or the like.

(1) The yield of tortilla dough and tortillas is increased.

(2) Microbiological spoilage of tortillas and tortilla dough is retarded.

At the same time, if this alkali is added after the washing, it has none of the effects already mentioned as occurring during the nixatamalization, the softening and the reaction already mentioned having already taken place at the time of the nixtamalization.

The results indicate that the sodium hydroxide or the like if used in the correct quantities produces these different effects because at the dough stage it no longer reacts with the corn in the same way that the calcium hydroxide, sodium hydroxide or the like reacted with the corn during steeping.

The alkali in the original steeping does not and cannot secure the later benefits as to yield and microbiological spoilage which the addition of alkali in controlled proportions after the washing secures, because the original alkali has to a considerable extent been removed in the intervening washing, which leaves the overall product afterwards at a pH of less than 7, as already indicated, and is part of the normal overall process of making a tortilla.

BACKGROUND OF THE INVENTION

Many experiments which apply to preventing the microbiological spoilage of the usual wheat, whole wheat and rye bread, commonly eaten, are not effective when applied to tortillas and tortilla dough because of the marked difference in their composition from the breads mentioned above. Among these differences are:

(1) Tortillas are made from whole corn, that is, corn which contains its germ, hull, bran, etc. Bread is made from dehulled, degermed and debranned wheat.

(2) Dehulled, degermed, debranned wheat used in making bread undergoes no chemical treatment before grinding. Whole corn used in making tortillas always undergoes the chemical treatment of steeping in limewater at pH 12 before grinding.

(3) Dehulled, degermed, debranned wheat used in making bread is ground into a flour in the dry state. Steeped whole corn used in making tortillas is ground into a dough in the wet state, after which the dough is either dried into a flour or used directly to make tortillas.

(4) The dough used for making bread is always prepared from dry dehulled, degermed, debranned wheat flour. The dough used for making tortillas may be prepared either from dry limed whole corn flour or directly by grinding whole corn steeped in limewater at pH 12.

(5) In addition to dehulled, degermed, debranned wheat flour, the dough used for making bread always contains some of the following ingredients: shortening, a leavening agent (yeast, air, or baking powder), salt, sugar, milk solids or milk, eggs or egg solids, and water. Dough used in making tortillas only contains ground limed whole corn and water.

(6) The final moisture content of bread after baking is approximately 20%; that of tortillas after cooking is approximately 45%. Due to its lower moisture content, bread is much less subject to microbial spoilage than tortillas.

(7) Bread is baked inside an oven by hot air at a temperature 425–500° F. for 30 to 60 minutes. Tortillas are cooked on a hot plate at 290–410° F., each side or face being exposed alternately to the heat for 15 to 20 seconds, after which the first side is again exposed for an additional 15 to 20 seconds.

(8) Other differences between bread and tortillas are the following:

(a) Dehulled, degermed, debranned wheat flour used in breadmaking is usually bleached; limed corn flour used for making tortillas is never bleached.
(b) Bread is usually leavened; tortillas are never leavened.
(c) Bread is always baked in the shape of loaves or rolls; tortillas are always shaped in the form of round, flat discs.
(d) The structure of bread is largely due to the presence of proteins known as "glutelin and gliadin" which are components of dehulled, degermed, debranned wheat. Corn contains no such protein, so that the structure of tortillas is due mostly to their starch component.

The base material for making tortillas is limed corn dough, whose preparation is described below:

Flat discs of dough of diameter 4-6 inches and height 2-3 millimeters are prepared either by hand, by use of any mechanical equipment which squashes or presses pieces of dough, or by any suitable automatic machine.

After they have been made, the flat discs of dough are cooked on a hot plate whose temperature varies from 290-410° F. In the cooking process, each face or side of the disc is alternately exposed to the heat for 15 to 20 seconds, after which the first side is again exposed for an additional 15 to 20 seconds.

The cooked discs or tortillas have a moisture content of 40-48% and are ready to eat.

Limed corn dough may be prepared from limed corn flour of size smaller than 45 U.S. Standard Mesh, 8-12% moisture content and pH 6-7. The dough is made by mixing 1.0-1.4 pounds of tap water per pound of flour.

Limed corn dough may also be made directly by grinding corn which has been steeped in limewater. In such case 1 pound of corn is steeped overnight in 0.5-0.8 pound of water, initially at boiling temperature, which contains 0.5-1.5% calcium hydroxide. It should be noted that when the corn is added to the limewater, the latter is either at or close to its boiling temperature. However, after both ingredients have been mixed, no further heat is applied so that the temperature of the mixture drops gradually during the steeping process.

INCREASE OF YIELD OF DOUGH AND TORTILLAS

It might be mentioned that tortillas, when normally prepared as described herein and without additives of any kind, have a maximum shelf life of 12 to 15 hours. After such time they are spoiled by microorganisms and become hard or stale.

It is known that tortillas when kept under conditions in which no moisture is lost, nevertheless become hard and inflexible with the passage of time and break or crumble easily when flexed or bent. This effect increases with time. Freshly made tortillas are very flexible but lose their flexibility with the passage of time. Hardening is appreciable after 24 hours, marked after 48 hours and almost complete after 72 hours if the product is kept at room temperature. It should be noted that the hardening or staling effect increases with decreasing temperature. At temperatures below room temperature, therefore, hardening proceeds at a faster rate than at room temperature and vice-versa. Hardening becomes still faster when you go from temperatures in between ordinary room temperature and freezing temperature to temperatures below the feezing point of water in the tortillas.

In determining the flexibility index a tortilla is bent around a bar of known radius, and this is tried with successively smaller bars until a bar is found which is the smallest around which the tortilla just breaks when it is flexed. A more flexible tortilla will just break when it is bent around a smaller bar than a less flexible tortilla. A higher flexibility index corresponds therefore to bars of lower radii and indicates higher flexibility.

TABLE 1

[Variation of the flexibility index of tortillas with time at room temperature]

| Flexibility index after the following elapsed time | | | | |
|---|---|---|---|---|
| 0 hr. | 24 hr. | 48 hr. | 72 hr. | 96 hr. |
| 8.5 | 7.7 | 6.5 | 6.0 | 5.5 |

Table 1 gives typical values for variation of the flexibility index of tortillas with time at room temperature.

Hardening or loss of flexibility of tortillas is believed to be due to a physico-chemical change in the starch constituent of tortillas which is known as retrogradation. This phenomenon has been studied in substances other than tortillas and is described in the technical literature (Whistler 1965).

The additive of the present invention imparts the property of retarding the loss of flexibility of tortillas with time. It must be mixed with the dough used for making tortillas, although as later explained, the mixture may be achieved in various ways.

Thus, in respect to this aspect of the invention, tortillas stored under conditions in which no moisture is lost from them become stale more slowly because of the additive of the invention, which retards hardening with time, retards loss of flexibility with time, increases the freshness of the tortillas, prolongs the flexible shelf life of the tortillas and increases the freshness of both freshly made tortillas and also reheated tortillas.

INTRODUCING THE ADDITIVE INTO THE DOUGH AND INCREASING THE YIELD

The additive may be introduced into the dough in any of several different ways. It may be added to the dough as an aqueous solution or dispersion which is thoroughly mixed in the dough to form a uniform distribution of the additive. Since this involves the addition of water to the dough, allowance must be made for the water incorporated with the additive, and compensation may be required in respect to the quantity of other water added. If the dough is made from limed corn flour, the additive may be dissolved or dispersed in the water which is subsequently to be mixed with the flour in order to make the dough. It will be understood that where the additive acts to increase the yield, the total amount of water used to make the dough of a certain consistency is greater than if the additive was not employed.

In some cases it is preferred to mix the additive with the dry limed corn flour prior to mixing the flour with the water.

ADDING ALKALINE SUBSTANCES TO INCREASE THE YIELD

The addition of edible water soluble alkaline materials to the tortilla dough so as to increase the pH to a range between 7.5 and 9.5 markedly increases the yield of tortilla dough and tortilla. The additives may be materials of the character of sodium hydroxide, soidum carbonate, sodium bicarbonate, trisodium phosphate, disodium hydrogen phosphate, and in doses between 0.25 and 2% on the weight of the tortillas or between 0.12 and 2% on the weight of the dough.

Table 2 shows the increase in yield.

TABLE 2

[Typical yield values obtained by addition of sodium hydroxide to dough and tortillas made from limed corn flour]

| Dose of sodium hydroxide based on weight of tortillas | Yield of dough, kilos per kilo of flour | Yield tortillas, kilos per kilo of flour |
|---|---|---|
| 0.0% (control) | 2.268 | 1.793 |
| 1.0% | 2.294 | 1.844 |

These alkaline materials may be incorporated as dry powders with the tortilla flour used in making up the dough or they can be dissolved in the water used in making the dough or they can be added in solution to incorporate with the dough, due allowance being made for the water which is introduced.

Example 1

Nixtamalized corn flour is mixed in a dough mixer with about 130 percent of water on the weight of the dry materials, the water having incorporated within it 1% of sodium hydroxide on the weight of the tortillas. The result is shown in the table.

Example 2

The procedure of Example 1 is followed except that the dough is made and then a 5% water solution of sodium hydroxide is incorporated in the dough mixer, due allowance being made for the water.

Example 3

The procedure of Example 1 is carried out except that sodium carbonate is incorporated. The results are comparable to the extent of the change in pH.

Example 4

The procedure of Example 1 is carried out except that trisodium phosphate is incorporated. The results are comparable to the extent of the change of pH.

ADDING ALKALIZING SUBSTANCES TO RETARD MICROBIOLOGICAL SPOILAGE

This section deals with the addition of substances to limed corn dough and/or tortillas for the purpose of retarding microbiological spoilage and increasing their shelf life.

It is known that limed corn dough and tortillas, because of their relatively high moisture content, are very susceptible to attack and spoilage by bacteria, yeasts, molds and other microorganisms. Limed corn dough has a higher moisture content than tortillas and is therefore more susceptible of spoilage. Table 3 gives typical moisture contents and shelf lives for limed corn dough and tortillas.

TABLE 3

[Typical moisture contents and shelf lives at 25° C. for limed corn dough and tortillas without additives of any kind]

| Product | Moisture content (percent) | Shelf life at 25° C. (hours) |
| --- | --- | --- |
| Dough | 55–60 | 6 |
| Tortillas | 42–48 | 12 |

The shelf life is the time required to detect unmistakable signs of microbiological spoilage in the product. In limed corn dough and tortillas these signs include production of off-flavors and odors, production of "rope" (a polysaccharide resulting from the growth of certain bacteria such as *B. mesentericus*) and appearance of moldy spots. The shelf life of a product depends upon the temperature at which it is stored. Lower temperatures correspond to longer shelf life in normal conditions. The spoilage which first occurs depends on the temperature. In limed corn dough and tortillas the first sign of spoilage at higher temperatures (above 30° C.) are usually off-flavors due to growth of bacteria, while at lower temperatures (below 30° C.) the first signs are appearance of moldy spots. Table 4 gives typical shelf lives of limed corn dough and tortillas at different temperatures.

TABLE 4

[Typical shelf lives of limed corn dough and tortillas at different temperatures]

| Product | Storage temperature (° C.) | Shelf life (hours) |
| --- | --- | --- |
| Dough | 37 | 3 |
|  | 25 | 6 |
|  | 15 | 12 |
| Tortillas | 37 | 6 |
|  | 25 | 12 |
|  | 15 | 18 |

The additives of the present invention have the property of retarding the growth of microorganisms which cause spoilage of dough and tortillas. They must be mixed with the dough, whether it is desired to preserve the dough as such or convert it into tortillas. The shelf life of dough containing the additives as well as the tortillas made from such dough are increased in the manner that will be subsequently shown.

The additives of the present invention may be incorporated in one of the following ways:

(1) They may be added to the dough as an aqueous solution, dispersion or suspension which is thoroughly mixed in the dough to form a uniform dispersion of the additive or additives. Since this involves the addition of water to the dough, allowance must be made for the water incorporated with the additive or additives and compensation may be required in respect to the quantity of other water added.

(2) If the dough is made from limed corn flour, the additive may be dissolved, suspended or dispersed in the water which is subsequently to be mixed with the flour in order to make the dough.

(3) In some cases it is preferable to mix the additive with dry limed corn flour prior to mixing the flour with the water.

The additive used in the present invention is capable of maintaining a pH of 8.5 to 9 and may be of a material of the class consisting of sodium, potassium and calcium hydroxides, sodium carbonate, sodium bicarbonate and any other material suitable in a concentration of from 0.1 to 0.8% of the weight of the tortilla, and additives to an extent to maintain a pH of 8.5 to 9 are what should be used in this invention when it is desired to prevent microbiological spoilage.

The following table shows a typical benefit from the addition of calcium hydroxide or sodium carbonate to tortillas at 25° C. in preventing microbiological spoilage:

TABLE 5

Effect of certain alkalizing substances in increasing the shelf life of tortillas at 25° C.

| Type of additive and dose: | Shelf life, hours |
| --- | --- |
| 0.3% calcium hydroxide | 48 |
| 0.5% calcium hydroxide | 72 |
| 0.4% sodium carbonate | 24 |
| Control | 12 |

The other alkalizing substances mentioned if they maintain a pH of 8.5 to 9.0 produce a similar effect on shelf life against microbiological spoilage of tortillas.

In view of my invention and disclosure, variations and modifications to meet individual whim or particular need will doubtless become evident to others skilled in the art, to obtain all or part of the benefits of my invention without copying the process and product shown, and I therefore claim all such insofar as they fall within the reasonable spirit and scope of my claims.

Having thus described my invention, what I claim as new and desired to secure by Letters Patent is:

1. A process of increasing the yield of tortillas, which comprises mixing nixtamalized corn or nixtamalized corn flour with water to make tortilla dough and incorporating in the dough from 0.12 to 2% on the weight of the tortilla dough of a water soluble edible alkaline substance, thereby producing a dough pH of between 7.5 and 9.5.

2. A process of claim 1, in which the substance is sodium hydroxide.

3. A process of claim 1, in which the substance is a compound of the class consisting of sodium carbonate and sodium bicarbonate.

4. A process of claim 1, in which the substance is a sodium phosphate.

5. The process of increasing the resistance to microbiological spoilage of tortilla dough which consists of mixing nixtamalized corn or nixtamalized corn flour with water in an amount sufficient to form a dough and incorporating therein from 2.1 to 0.8% of the weight of the tortilla dough of a compound of the class consisting of sodium potassium and calcium hydroxides, sodium carbonate and sodium bicarbonate, thereby producing tortilla dough having a pH between 8.5 and 9.0.

References Cited

UNITED STATES PATENTS

| | | | |
|---|---|---|---|
| 2,704,257 | 3/1955 | DeSollano et al. | 99—83 |
| 3,194,664 | 7/1965 | Eytinge | 99—80 |

RAYMOND N. JONES, Primary Examiner